(No Model.)
F. O. BOËS.
BRAKE FOR CHILDREN'S CARRIAGES.
No. 509,288. Patented Nov. 21, 1893.
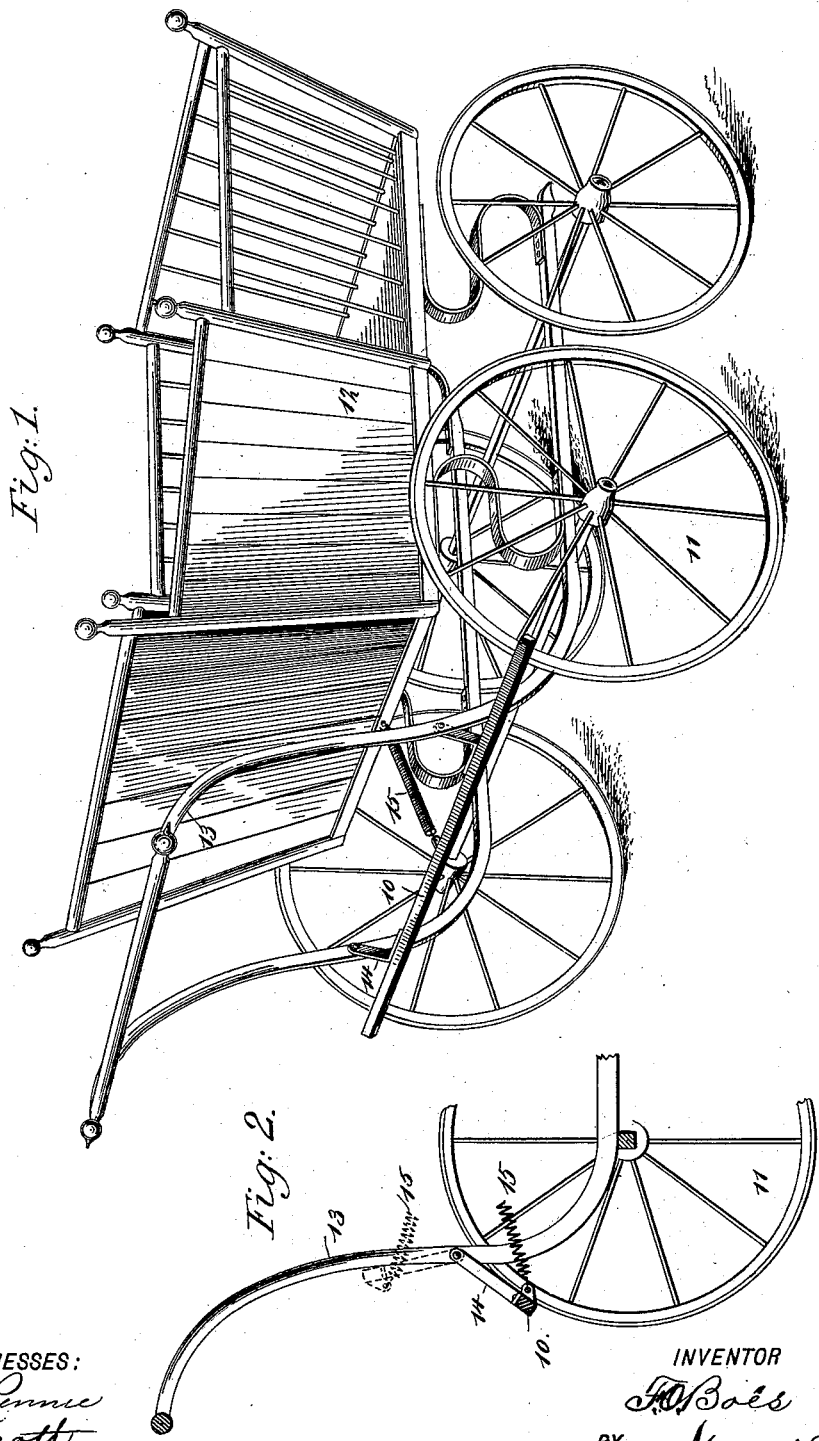
WITNESSES:
INVENTOR
ATTORNEYS.
THE NATIONAL LITHOGRAPHING COMPANY,
WASHINGTON, D. C.

UNITED STATES PATENT OFFICE.

FREDERICK O. BOËS, OF NEW YORK, N. Y.

BRAKE FOR CHILDREN'S CARRIAGES.

SPECIFICATION forming part of Letters Patent No. 509,288, dated November 21, 1893.

Application filed July 25, 1893. Serial No. 481,432. (No model.)

*To all whom it may concern:*

Be it known that I, FREDERICK O. BOËS, of New York city, in the county and State of New York, have invented a new and useful Improvement in Brakes for Children's Carriages, of which the following is a full, clear, and exact description.

My invention relates to an improvement in brakes for children's carriages, and it has for its object to construct a brake capable of convenient application to any style of child's carriage, and to provide a means whereby the brake may be expeditiously carried out of engagement with the tires of the rear wheels of the carriage, or placed in engagement therewith, and held securely in either position.

The invention consists in the novel construction and combination of the several parts, as will be hereinafter fully set forth and pointed out in the claim.

Reference is to be had to the accompanying drawings forming a part of this specification, in which similar figures of reference indicate corresponding parts in both the views.

Figure 1 is a perspective view of a carriage having the brake applied thereto; and Fig. 2 is a vertical section through the brake and through a portion of the carriage.

In carrying out the invention, the brake may be said to consist of a bar 10, adapted for engagement with the tires of the rear wheels 11 of the carriage 12. The bar may be perfectly smooth upon the face which engages with the wheels, or it may be roughened, or covered with a material such as leather, or rubber or their equivalents. The brake bar is adapted for attachment to the handle bars 13 of the carriage, and to that end a pivotal connection is effected between the handle bars and the brake bar through the medium of links or brackets 14, or like devices, which are ordinarily secured to the brake bar and pivoted to the inner faces of the handle bar, as shown in the drawings.

The pivotal connection between the brake bar and the handle bars of a carriage is so effected that when the brake bar is in its lower position it will rest upon the tires of the rear wheels of the carriage, as shown in positive lines in Figs. 1 and 2; and when not required for use the brake bar is carried upward to the position shown in dotted lines in Fig. 2, engaging with the handle bars, and removed from engagement with the wheels. The brake bar is held in either of the two positions above named through the medium of a spring 15, which is preferably secured to the central portion of the brake bar, and to the back of the carriage, ordinarily to the back or rear edge of the bottom of the carriage body.

The spring, when the brake bar is in braking position will exert such tension upon the brake bar as to hold it firmly against the wheels; and when the brake bar is thrown up to an engagement with the handle bars the spring will likewise maintain it in its upper position, since the spring, when the handle bar is in either position will exert tension diagonally upon it, the two lines of tension of the spring representing practically the members of the letter V.

It will be observed that when the brake bar is in engagement with the wheels of the carriage, the carriage can not be moved unless force is brought to bear, and therefore the carriage may be permitted to remain even upon an inclined surface without danger of its changing its position. It is likewise evident that the bar is expeditiously and conveniently applied, and as readily manipulated when it is desirable to remove the brake from the wheels.

Having thus described my invention, I claim as new and desire to secure by Letters Patent—

The combination, with a child's carriage, of a brake bar adapted for engagement with the wheels thereof, a pivotal connection between the brake bar and the handle bars of the carriage, and a spring connected with the brake bar and with a fixed support on the carriage, the point of attachment of the spring to the carriage being on a line drawn substantially about midway between the upper and the lower throw of the brake bar, as and for the purpose specified.

FREDERICK O. BOËS.

Witnesses:
   J. FRED ACKER,
   C. SEDGWICK.